United States Patent [19]

Méry et al.

[11] Patent Number: 4,632,227
[45] Date of Patent: Dec. 30, 1986

[54] PAD AND TORQUE SUPPORT ASSEMBLY FOR DISC BRAKE

[75] Inventors: Jean-Claude Méry, Pavillons-sous-Bois; Jean-Paul Sauvée, Aubervilliers; Alain Thioux, Chennevieres, all of France

[73] Assignee: Societe Anonyme D.B.A., Paris, France

[21] Appl. No.: 679,176

[22] Filed: Dec. 7, 1984

[30] Foreign Application Priority Data

Dec. 15, 1983 [FR] France .............................. 83 20093

[51] Int. Cl.$^4$ ............................................. F16D 65/06
[52] U.S. Cl. ................................. 188/73.32; 188/73.1; 188/250 B; 188/73.39
[58] Field of Search .................. 188/73.39, 73.1, 73.2, 188/73.31, 73.32, 73.34, 73.41, 71.1, 234, 242, 243, 244, 250 B, 250 G, 253, 261, 370, 73.44, 73.45

[56] References Cited

U.S. PATENT DOCUMENTS

| 3,162,272 | 12/1964 | Gancel | 188/73.41 |
| 3,166,157 | 1/1965 | Burnett | 188/73 |
| 3,230,306 | 5/1973 | Rath | 188/370 X |
| 3,322,236 | 5/1967 | Burnett | 188/73.39 X |
| 3,611,988 | 10/1971 | Hess | 188/73.1 X |
| 3,756,353 | 9/1973 | Bombassei et al. | 188/73.44 |
| 3,972,393 | 8/1976 | Courbet et al. | 188/73.1 X |
| 4,064,974 | 12/1977 | Filderman | 188/73.31 X |
| 4,373,616 | 2/1983 | Kondo | 188/73.32 X |
| 4,463,837 | 8/1984 | Courbot | 188/73.44 X |
| 4,533,025 | 8/1985 | Carre | 188/73.1 X |
| 4,566,564 | 1/1986 | Bolenbaugh et al. | 188/73.1 |

FOREIGN PATENT DOCUMENTS

| 27714 | 4/1981 | European Pat. Off. . |
| 80950 | 6/1983 | European Pat. Off. . |
| 1954332 | 5/1971 | Fed. Rep. of Germany . |
| 1353849 | 1/1964 | France . |
| 1360566 | 3/1964 | France . |
| 1484078 | 6/1967 | France . |
| 1518748 | 3/1968 | France . |
| 2085932 | 12/1971 | France . |
| 2316844 | 1/1977 | France . |
| 2325298 | 4/1977 | France . |

Primary Examiner—Duane A. Reger
Assistant Examiner—Michael P. Gilday
Attorney, Agent, or Firm—Larry J. Palguta; Ken C. Decker

[57] ABSTRACT

The invention concerns a pad and torque support assembly for a disc brake. The pad incorporates a first pair of twin surfaces (54) formed on the torque support (10) and a second pair of surfaces for anchoring and for sliding (56) radially offset from the first pair and cooperating with a second pair of twin surfaces (58) formed in the torque support, allowing a circumferential offset between two pads of the same brake.

4 Claims, 6 Drawing Figures

FIG_1

FIG_4

PAD AND TORQUE SUPPORT ASSEMBLY FOR DISC BRAKE

The subject of the present invention is a pad and torque support assembly for a disc brake incorporating a caliper sliding on a fixed support by means of at least one axial pillar.

The European Patent Application filed under No. 0,080,950 shows and describes a disc brake incorporating a caliper mounted so as to slide on a fixed support through a single axial pillar. This brake incorporates two friction components spaced tangentially on each side of a radial plane passing through the axis of the brake actuator, thus allowing the differential wear on the inner and outer friction components to be corrected. Incorrect mounting of these friction components would result in increased differential wear, and this is why the friction components incorporate locating devices which ensure correct mounting of the friction components, that is to say spacing the friction components relative to one another in the desired direction. This is obtained with the aid of a locating system preventing incorrect mounting of the inner pad and of the outer pad. However, this location is valid for one brake, and the brake of the opposite hand must incorporate pads which are themselves handed so as to achieve the offsetting of the pads in the desired direction. Confusion between the pads of the brake on the right hand side and the pads of the brake on the left hand side will result in reversed mounting of the offsets, and the differential wear, that is to say the oblique wear of the pads in the longitudinal direction, will only be more pronounced.

The aim of the invention is to propose a pad and torque support assembly for a disc brake having all the advantages of pads offset in the correct direction, and in which the risk of incorrect mounting of the friction components is eliminated. All the pads being identical, incorrect mounting of the latter becomes impossible, even for a non-specialist. In addition, due to the invention, the brake assembly is lighter, cheaper to manufacture and its maintenance is simplified. For these reasons the pad is novel.

With this as the aim, the invention proposes a pad and torque support assembly for a disc brake incorporating a caliper sliding on a fixed support by means of at least one axial pillar lying parallel to the axis of the disc, a brake actuator acting directly upon an inner friction component and, by reaction through the caliper, upon an outer friction component, the friction components being tangentially offset on both sides of a radial plane passing through the axis of the brake actuator, characterized in that each of the friction components incorporates two pairs of surfaces for anchoring and for sliding, a first said pair cooperating with a first pair of twin surfaces formed in the torque support, a second said pair cooperating with a second pair of twin surfaces formed in the torque support.

It will be understood that due to such a construction, according to the offset desired, the latter is obtained by offsetting the twin surfaces formed on the torque support, and according to the tangential offset desired, the friction components are anchored either by the first pair, or by the second pair of surfaces for anchoring and for sliding.

According to another characteristic of the invention, the pad and torque support assembly incorporates retaining means which prevent the friction components escaping in a radial direction relative to the torque support.

Other characteristics and advantages of the pad and torque support assembly, the subject of the present invention, will emerge from the detailed description, with reference to the accompanying drawings, in which.

Figure 1:
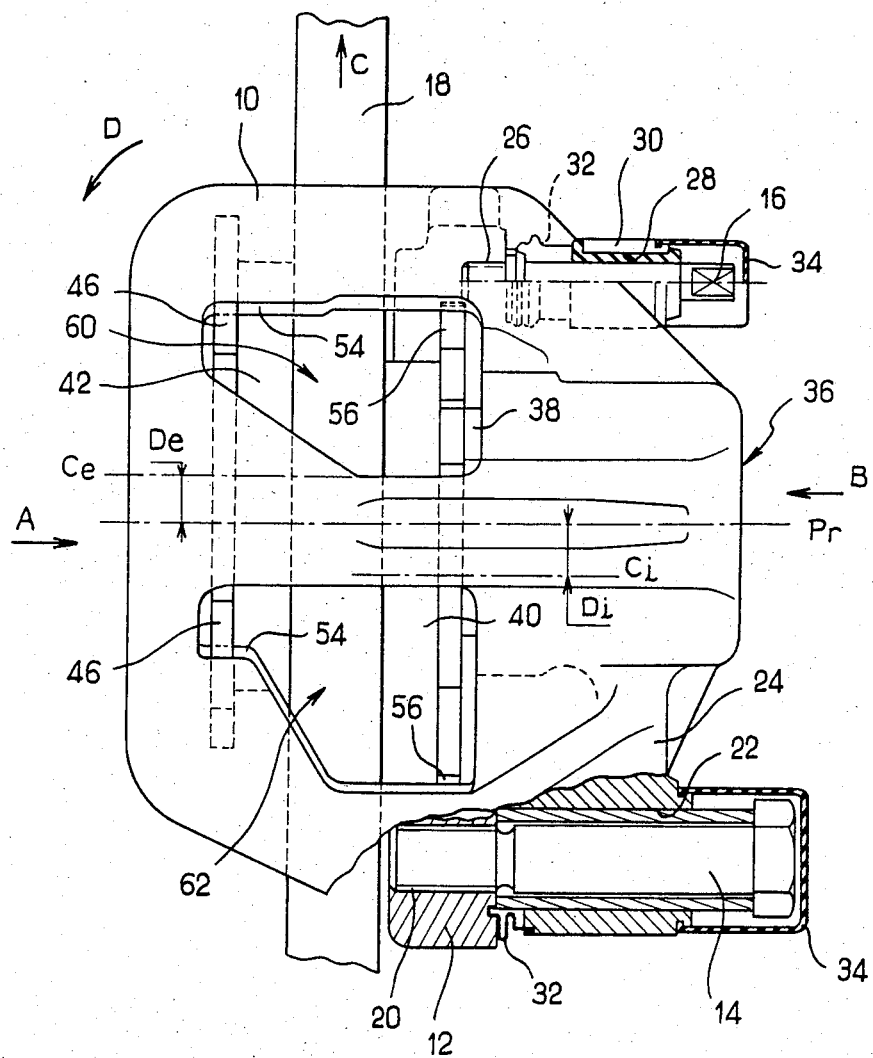
FIG. 1 is a plan view of a disc brake constructed in accordance with the present invention and incorporating portions shown in section.
Figure 2:
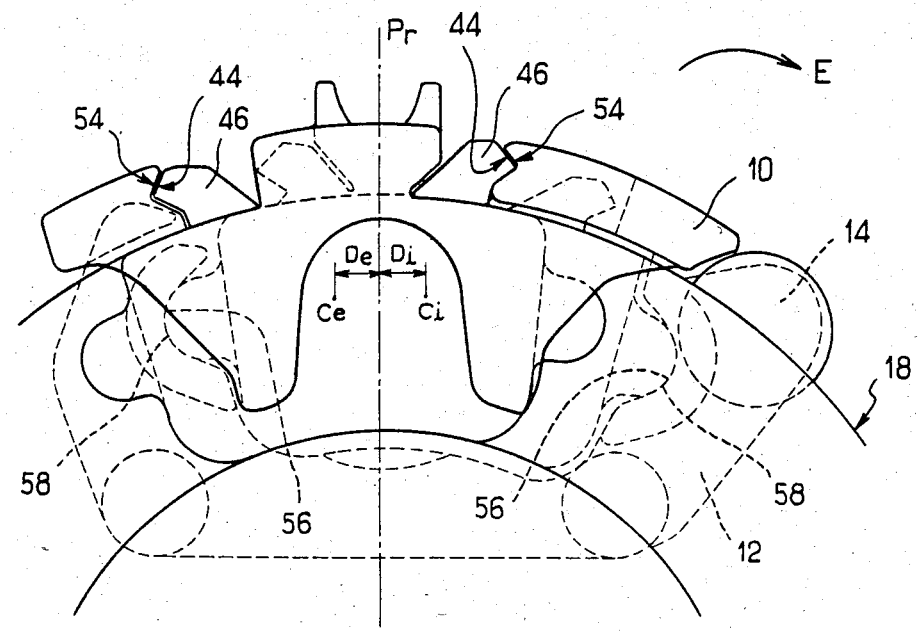
FIG. 2 is a front view of the disc brake in the direction of the arrow A shown in FIG. 1.
Figure 3:
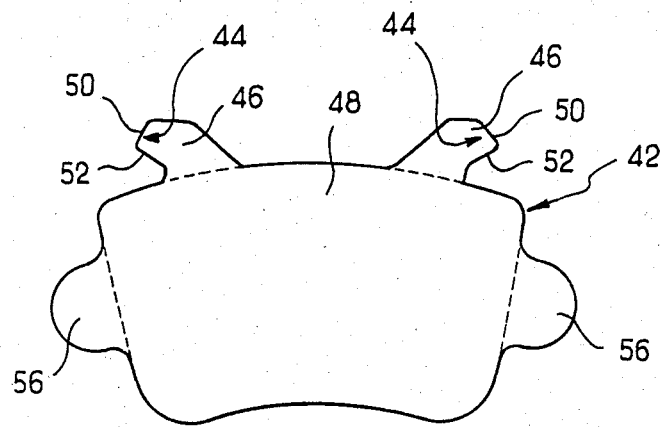
FIG. 3 is a view of a friction component constructed in accordance with the invention.

The disc brake shown in FIGS. 1 to 3 incorporates a movable caliper 10 mounted so as to slide on a fixed support 12. The caliper 10 is mounted so as to slide on the fixed support 12 by means of two pillars 14 and 16 lying parallel to the axis of rotation of the rotating disc 18. As shown more particularly in FIG. 1, the axial pillar 14 is fixed to the fixed support 12 by a screwed connection. The axial pillar 14 is housed so as to slide in a cylindrical bore 22 formed in an arm 24 of the caliper 10. In the same way, the pillar 16, fixed to the fixed support 12 by means of a screwed connection 26, is housed so as to slide in a bore 28 formed in an arm 30 of the caliper 10. The asymmetry of the pillars 14 and 16 will be noted, the one 14 carrying a portion of the braking torque, the other 16 simply intended to hold the caliper relative to the fixed support 12. Bellows 32 and a cap 34 are provided on both pillars to protect the sliding surfaces. A brake actuator, designated as an assembly by the reference 36, incorporates in a known manner a piston 38 capable of being pushed in the direction of the arrow B when fluid under pressure is introduced into a chamber of the brake actuator (not shown). The piston 38 is capable of acting directly upon an inner friction component 40, and by reaction through the sliding caliper, upon an outer friction component 42, to cause frictional engagement of the components 40 and 42 with the opposite surfaces of the disc 18. Designating the radial plane passing through the center of the brake actuator 36 by the reference Pr, it can be seen, in particular in FIGS. 1 and 2, that the center Ce of the outer friction component 42 is circumferentially offset relative to the plane Pr by an amount De in the direction of the arrow C, which corresponds to the rotation of the disc 18 in the forward direction. In the same way, the center Ci of the inner friction component 40 is circumferentially offset by an amount Di relative to the plane Pr in a direction opposite to that of the arrow C. The amounts De and Di are equal and positioned each side of the radial plane Pr, and it will be understood that the frictional engagement of the two friction components with the rotating disc creates a torque in the direction of the arrow D shown in FIG. 1, thus correcting the differential wear for both friction components. This correction phenomenon is broadly explained in the European Patent Application mentioned above and will not be developed further at present.

According to the invention, each of the friction components 40 and 42 incorporates two pairs of surfaces for anchoring and for sliding. Referring to FIGS. 2 and 3, it can be seen that each friction component incorporates a first pair of surfaces for anchoring and for sliding 44 formed on lugs 46 extending radially outwards relative to a body 48 formed on the lining carrier of the friction component. The first pair of surfaces for anchoring and for sliding 44 is formed by two inclined surfaces 50 and 52 spaced circumferentially in pairs and entering into grooves 54 formed in the caliper 10. These grooves 54 offer twin shapes to the surfaces 50 and 52 of the friction component, and thus form the first pair of twin surfaces formed on the torque support, which for this pad is formed by the caliper 10, as may be seen in FIG. 1. It is understood that the grooves 54 are themselves offset relative to the radial plane by the same amount De as previously indicated. Referring to FIG. 3, it can be seen that the friction component 42 also incorporates two circumferentially spaced bell-shaped projections 56, formed in the embodiment shown by portions of circles. These projections 56 form the second pair of surfaces for anchoring and for sliding. For the inner friction component 40 this second pair 56 cooperates with grooves 58 of twin shapes formed in the fixed support 12. These grooves 58 thus form the second twin pair, formed, in the embodiment shown, in the fixed support 12, which serves as torque support for the inner friction component. The grooves 58 are also offset relative to the radial plane Pr by an amount Di on the opposite side to the offset De, previously mentioned, of the outer friction component. As may be seen, the grooves 54 and 58, having depressions, form, together with the projections 44 and 56, retaining means preventing escape of the friction components in a radial direction.

Referring to FIG. 1, it can be seen that the caliper 10 incorporates two radial openings 60 and 62 which allow the inner friction component 40 to cooperate with the fixed support 12 by means of the projections 56, without the projections 46 cooperating with the caliper 10, as shown dotted in FIG. 2. It will be noted that for the other brake on the same axle, of the opposite hand relative to the brake shown in FIG. 1, as the caliper and the fixed support are also of the opposite hand, a paired symmetry will be obtained of the two outer pads, taken together, and of the two inner pads, taken together, relative to the longitudinal axis of the vehicle. This is nevertheless obtained with identical pads as shown in FIG. 3.

The mounting of the brake and of the friction components is carried out in the following manner: the caliper 10 is first equipped with its brake actuator 36 and with its pillars 14 and 16, the protective devices 34 being removed. The vehicle being already equipped with the fixed support 12, the pillar 14 is screwed into the latter by means of the screwed connection 20. By tilting the caliper about the pillar 14 in the direction of the arrow E shown in FIG. 2, access to the fixed support is obtained and the friction component 40 is positioned in the grooves 58 formed in the fixed support 12 by introducing the friction component 40 in the direction of the arrow B shown in FIG. 1. The caliper being tilted in the direction of the arrow E shown in FIG. 2, the friction component 42 is offered to the caliper from the inside, in such a way that the projections 46 enter the openings 60 and 62 in the latter. By translation of the friction component 42 relative to the caliper 10 in the direction of the arrow B, the first pairs of surfaces for anchoring and for sliding 44 are entered into the grooves 54 formed in the caliper. An additional advance in the direction of the arrow B allows the friction component 42 to come to bear upon the nose of the caliper 10 as shown in FIG. 1. The caliper is then tilted in the direction opposite to that of the arrow E shown in FIG. 2, in such a way that the pillar 16 is positioned facing the screwed connection 26 of the fixed support 12. This pillar 16 is then screwed into position and the protective devices 34 are positioned on the pillars 14 and 16.

Dismantling operations are carried out in the reverse order of the operations which are described above.

It can be seen from the foregoing description that it is not possible to carry out an incorrect mounting of the friction components; in fact the fixed support 12 is only provided with grooves 58 which are capable of accepting the projections 56 of the inner friction component 40, and it is provided with nothing which could cooperate with the projections 46. In the same way, concerning the outer friction component 42, the caliper is only provided with grooves 54 which are capable of accepting the projections 46 and the sliding surfaces 50 and 52, and consequently the projections 56 cannot be used in any way for the outer friction component 42. Correct positioning is thus ensured, and it will be noted that the location and offsetting of the friction components is very simply obtained, that is to say the grooves 54 and 58 are simply broached in the corresponding components, that is to say the caliper 10 and the fixed support 12; it will also be noted that this broaching operation is made possible over short lengths due particularly to openings 60 and 62 of the caliper 10, and to the shape of the nose of the caliper which allows the broaches to pass each side of this caliper.

Figure 4:
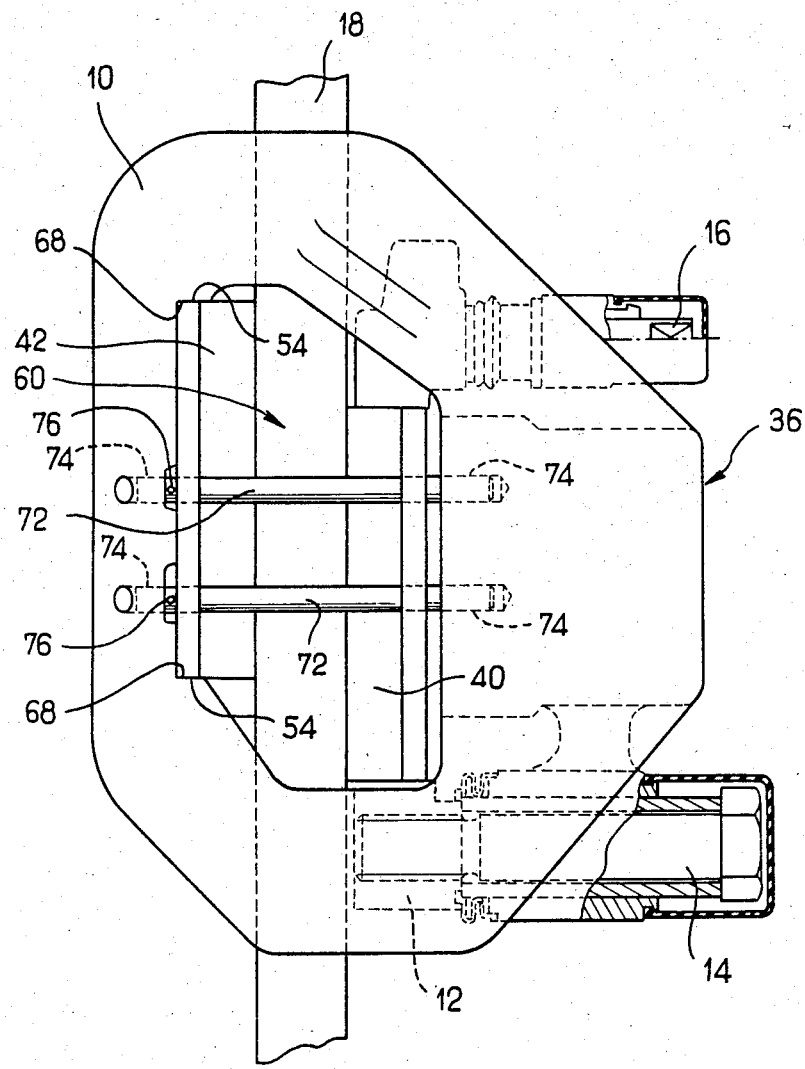
FIG. 4 is a view similar to that shown in FIG. 1 for a second embodiment of the invention.
Figure 5:
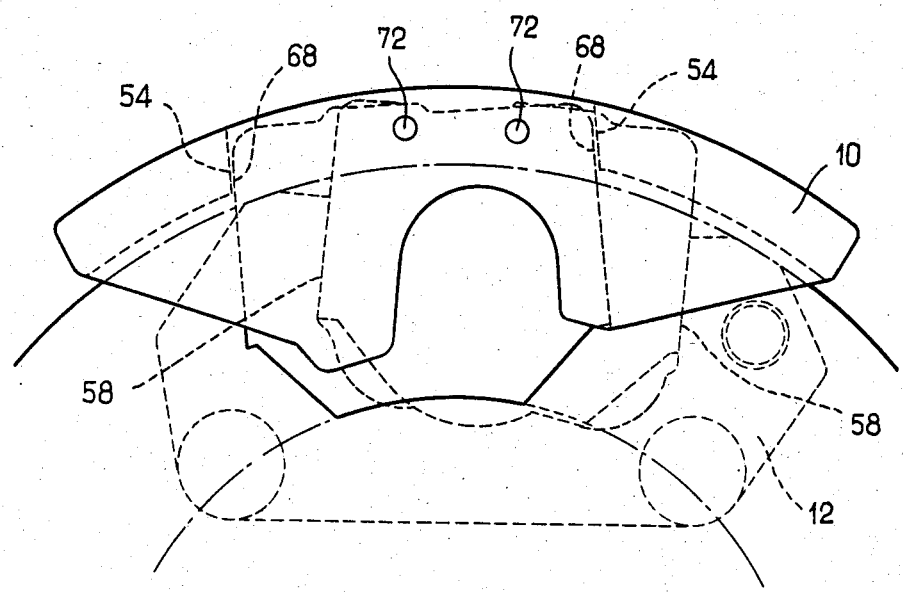
FIG. 5 is a front view of the brake shown in FIG. 4.
Figure 6:
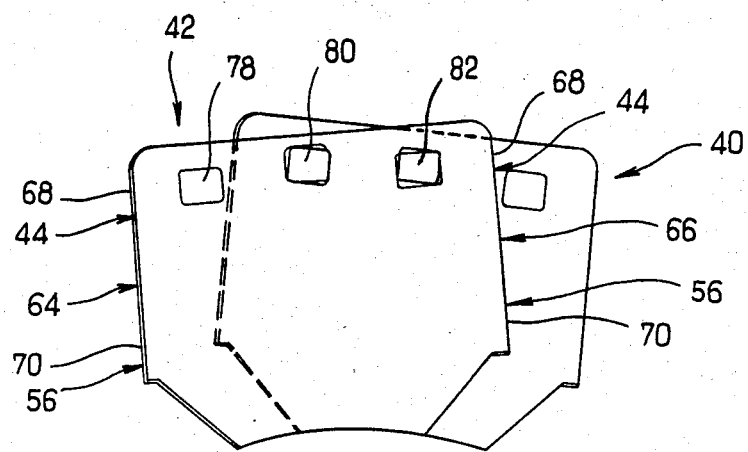
FIG. 6 is a view of two friction components positioned as they are in the brake shown in FIG. 5.

Referring to FIGS. 4 to 6, in which a second embodiment of the invention is shown, the same components fulfilling the same functions carry the same references.

In this second embodiment, the friction components have circumferentially spaced parallel edges 64 and 66, each of which incorporates a first flat zone 68 and a second flat zone 70, radially spaced, the zones 68 forming the first pair of surfaces for anchoring and for sliding, the zones 70 forming the second pair of surfaces for sliding and for anchoring. As may be seen in FIGS. 4 and 5, the outer friction component 42 bears against twin surfaces 54 formed on the caliper 10. In the same way, the inner friction component 40 is positioned facing twin surfaces 58 formed in the fixed support 12 and positioned towards the inside, in a radial direction, relative to the surfaces 54. The surfaces 58 form the second pair of twin surfaces. In the embodiment shown in FIGS. 4 to 6, the friction components 40 and 42 are retained relative to the caliper by means of a rod, in the example shown by two rods 72, which enter openings 74 formed in the caliper 10. These rods 72 are immobilized in a known manner by means of pins 76 passing through holes formed in these rods and coming to bear axially, firstly, against the outer friction component 42, and secondly, against the bottom of a notch formed in the nose of the caliper 10. Referring to FIGS. 5 and 6, it can be seen that the friction components 40 and 42 each incorporate three openings 78, 80 and 82 for the friction component 42 as shown in FIG. 6, the three openings being positioned in such a way that two of them, 80 and 82 for the friction component 42, accept the rods 72, the friction component 40 also accepting symmetrically the rods 72, the openings 78, 80 and 82 together with the rods 72 forming the means for radial retention of the friction components. In the same way as for the previous embodiment, the pads being identical, there can be no question of a mounting error of the friction components. In fact, in this embodiment, the mounting of the friction components only being carried out after the assembly of the pillars 14 and 16, the friction components are introduced towards the inside in the radial direction through the opening 60 in the caliper, the friction component 40 being introduced radially until it takes its position in the fixed support 12, the outer pad 42 also being introduced through the opening 60, between the edges 54 forming a first pair of twin surfaces, until the rods 72 can be introduced through holes 74 and through openings 80 and 82, then through corresponding openings in the friction component 40, and finally through holes 74 formed in the caliper, on the same side as the brake actuator 36, any other mounting being impossible.

From the foregoing description, it can be seen that due to the invention, the pad and torque support assembly is constructed so as to obtain the desired tangential offset without risk of mounting errors, in particular, due to the fact that the pads are all identical and that the latter incorporate two pairs of anchoring surfaces, each pair being used only for a specific function, that is to say, inner friction component or outer friction component. The offset for a brake of the opposite hand is obtained by opposite handed construction of the caliper and of the fixed support.

It will be understood that the invention is not limited to the two embodiments described and that modifications may be carried out without departing from the framework of the present invention. In particular, the shapes of the first and second pairs of surfaces for anchoring and for sliding may be modified, the brake actuator may be hydraulic and/or mechanical, and indeed the friction components also may both be housed in the caliper without departing from the framework of the invention. In the same way, in the embodiments in accordance with FIGS. 4 to 6, the number of rods may be reduced to one only, in which case the friction components advantageously incorporate only two openings 78 and 80, or increased to three, in which case the friction components each incorporate four openings for the rods to pass through.

What is claimed is:

1. A friction pad and torque support assembly for a disc brake, comprising axially inner and outer friction pads, a caliper sliding on a fixed support member by means of at least one axial pillar disposed parallel to an axis of the disc, a brake actuator acting directly upon the inner friction pad, and the friction pads being circumferentially offset relative to a radial plane passing through an axis of the brake actuator, characterized in that the inner and outer friction pads are identically shaped, each of said friction pads having two radially spaced-apart and coplanar pairs of surfaces for anchoring and sliding engagement by the respective pad, the coplanar pairs of surfaces disposed symmetrically with respect to a middle axis of the respective friction pad, only one pair of said radially spaced-apart and coplanar pairs of surfaces of each friction pad being in anchoring and sliding engagement, the two radially spaced-apart pairs of surfaces comprising a first pair of radially outer surfaces and a second pair of radially inner surfaces, only the second pair of radially inner surfaces of the inner friction pad in anchoring and sliding engagement with a pair of complementary-shaped inner radial surfaces on said support member, only the first pair of radially outer surfaces of the outer friction pad in anchoring and sliding engagement with a pair of complementary-shaped outer radial surfaces on said caliper, the identically shaped friction pads being interchangeably mountable on the support member and caliper without the possibility of incorrect mounting thereof, and further comprising retaining means formed by at least one rod disposed radially outwardly of said disc and supported by the caliper, the friction pads each having at least two openings therethrough and the rod extending through aligned but different ones, relative to the respective two openings, of the openings of the circumferentially offset friction pads.

2. The friction pad and torque support assembly in accordance with claim 1, wherein the retaining means comprises two radially outer rods supported by the caliper, the friction pads each having three openings therethrough and the rods extending through aligned but different sets, relative to the respective three openings, of two openings, of the circumferentially offset pads.

3. The friction pad and torque support assembly in accordance with claim 2, wherein each pad has edges that are essentially parallel and include two flat zones spaced radially apart and forming the first pair and second pair of radially outer and inner surfaces for anchoring and sliding engagement.

4. The friction pad and torque support assembly in accordance with claim 3, wherein each pad has an arcuate-shaped, circumferentially extending bottom edge.

* * * * *